United States Patent
Brockway et al.

(10) Patent No.: US 11,209,226 B2
(45) Date of Patent: Dec. 28, 2021

(54) DROPLET EJECTING COATINGS

(71) Applicant: Nelumbo Inc., Hayward, CA (US)

(72) Inventors: Lance R. Brockway, Hayward, CA (US); David C. Walther, Hayward, CA (US)

(73) Assignee: Nelumbo Inc., Hayward, CA (US)

( * ) Notice: Subject to any disclaimer, the term of this patent is extended or adjusted under 35 U.S.C. 154(b) by 22 days.

(21) Appl. No.: 16/334,198

(22) PCT Filed: Sep. 19, 2017

(86) PCT No.: PCT/US2017/052119
§ 371 (c)(1),
(2) Date: Mar. 18, 2019

(87) PCT Pub. No.: WO2018/053452
PCT Pub. Date: Mar. 22, 2018

(65) Prior Publication Data
US 2019/0204030 A1      Jul. 4, 2019

Related U.S. Application Data

(60) Provisional application No. 62/396,728, filed on Sep. 19, 2016, provisional application No. 62/397,319, filed on Sep. 20, 2016.

(51) Int. Cl.
*F28F 13/18* (2006.01)
*B05D 5/02* (2006.01)
(Continued)

(52) U.S. Cl.
CPC ............. *F28F 13/187* (2013.01); *B05D 1/18* (2013.01); *B05D 1/38* (2013.01); *B05D 3/065* (2013.01);
(Continued)

(58) Field of Classification Search
CPC ......... B05D 7/52; B82Y 30/00; F28F 2245/04
(Continued)

(56) References Cited

U.S. PATENT DOCUMENTS

| 8,540,889 B1 | 9/2013 | Hartlove et al. |
| 9,147,633 B2 | 9/2015 | Eid et al. |

(Continued)

FOREIGN PATENT DOCUMENTS

| CN | 201575646 U | 9/2010 |
| CN | 102748987 A | 10/2012 |

(Continued)

OTHER PUBLICATIONS

Miljkovic, N., et al., Jumping-Droplet-Enhanced Condensation on Scalable Superhydrophobic Nanostructured Surfaces, 2013, Nano Lett. 13:179-187.

(Continued)

*Primary Examiner* — Henry T Crenshaw
(74) *Attorney, Agent, or Firm* — FisherBroyles, LLP; Jill A. Jacobson

(57) ABSTRACT

Coating compositions are provided that eject droplets of condensed fluid from a surface. The coatings include a nanostructured coating layer and in some embodiments, also include a hydrophobic layer deposited thereon. The coating materials eject droplets from the surface in the presence of non-condensing gases such as air and may be deployed under conditions of supersaturation of the condensed fluid to be ejected. A heat exchanger design utilizing the coating is described herein.

21 Claims, 6 Drawing Sheets

(51) Int. Cl.
| | |
|---|---|
| *B82Y 30/00* | (2011.01) |
| *C03C 17/42* | (2006.01) |
| *C03C 17/25* | (2006.01) |
| *B05D 1/18* | (2006.01) |
| *B05D 1/38* | (2006.01) |
| *B05D 3/06* | (2006.01) |
| *B05D 3/10* | (2006.01) |
| *B05D 3/12* | (2006.01) |
| *B05D 7/14* | (2006.01) |
| *B05D 7/00* | (2006.01) |
| *C23C 18/12* | (2006.01) |
| *B82Y 40/00* | (2011.01) |

(52) U.S. Cl.
CPC ........... *B05D 3/102* (2013.01); *B05D 3/12* (2013.01); *B05D 5/02* (2013.01); *B05D 7/14* (2013.01); *B05D 7/50* (2013.01); *B05D 7/52* (2013.01); *C03C 17/25* (2013.01); *C03C 17/42* (2013.01); *B05D 2202/25* (2013.01); *B05D 2350/63* (2013.01); *B05D 2401/20* (2013.01); *B05D 2506/15* (2013.01); *B82Y 30/00* (2013.01); *B82Y 40/00* (2013.01); *C03C 2217/75* (2013.01); *C23C 18/1216* (2013.01); *C23C 18/1241* (2013.01); *C23C 18/1254* (2013.01); *C23C 18/1283* (2013.01); *F28F 2245/02* (2013.01); *F28F 2245/04* (2013.01)

(58) Field of Classification Search
USPC ........................................................ 165/33
See application file for complete search history.

(56) References Cited

U.S. PATENT DOCUMENTS

| | | | |
|---|---|---|---|
| 9,362,201 B2 | 6/2016 | Gavillet et al. | |
| 2004/0055892 A1 | 3/2004 | Oh et al. | |
| 2004/0118698 A1 | 6/2004 | Lu et al. | |
| 2006/0141268 A1 | 6/2006 | Kalkan et al. | |
| 2010/0099012 A1 | 4/2010 | Adzic | |
| 2010/0203287 A1 | 8/2010 | Jiang et al. | |
| 2010/0252241 A1* | 10/2010 | McDermott | C25D 11/36 165/151 |
| 2010/0294475 A1 | 11/2010 | Rush | |
| 2011/0039972 A1 | 2/2011 | Bauer | |
| 2011/0198059 A1 | 8/2011 | Gavillet et al. | |
| 2011/0253007 A1 | 10/2011 | Zastrau et al. | |
| 2012/0231290 A1 | 9/2012 | Ho et al. | |
| 2012/0328505 A1* | 12/2012 | Frei | B01J 35/002 423/579 |
| 2013/0244001 A1* | 9/2013 | Wang | C23C 8/42 428/141 |
| 2013/0330501 A1 | 12/2013 | Aizenberg et al. | |
| 2014/0011013 A1 | 1/2014 | Jin et al. | |
| 2014/0017456 A1 | 1/2014 | Xiao et al. | |
| 2014/0178641 A1* | 6/2014 | Leblanc | B32B 5/16 428/143 |
| 2014/0182790 A1 | 7/2014 | Hwang et al. | |
| 2014/0208978 A1 | 7/2014 | Sunder et al. | |
| 2014/0231052 A1* | 8/2014 | Takasawa | F28F 3/02 165/133 |
| 2014/0238646 A1* | 8/2014 | Enright | H01L 23/427 165/104.21 |
| 2014/0247556 A1 | 9/2014 | Eid et al. | |
| 2015/0175317 A1* | 6/2015 | Imai | C09D 5/1693 220/200 |
| 2016/0068703 A1 | 3/2016 | Schmidt et al. | |
| 2016/0097606 A1 | 4/2016 | Xiao et al. | |
| 2017/0282416 A1 | 10/2017 | Kim et al. | |

FOREIGN PATENT DOCUMENTS

| | | |
|---|---|---|
| CN | 103173832 A | 6/2013 |
| CN | 104451814 A | 3/2015 |
| EP | 2752504 B1 | 4/2016 |
| WO | 2014/012052 A1 | 1/2014 |
| WO | 2017/031391 A1 | 2/2017 |
| WO | 2018/053452 A1 | 3/2018 |
| WO | 2018/053453 A1 | 3/2018 |
| WO | 2018/132519 A1 | 7/2018 |

OTHER PUBLICATIONS

Miljkovic, N., et al., Modeling and Optimization of Superhydrophobic Condensation, 2013, J. Heat Transf.-Trans. ASME 135:14.

Miljkovic, N., et al., Condensation heat transfer on superhydrophobic surfaces, 2013, MRS Bull. 38:397-406.

Aili, A., et al., Characteristics of Jumping Droplet-Enhanced Condensation on Nanostructured Micromesh Surface, 2016, ASME International Conference on Micro/Nanoscale Heat and Mass Transfer, V001T004A001.

Kang, S.M., et al., Directional Oil Sliding Surfaces with Hierarchical Anisotropic Groove Microstructures, Aug. 5, 2013, Adv. Mater. 25(40):5756-5761.

Tuteja, A., et al., Design Parameters for Superhydrophobicity and Superoleophobicity, Jan. 1, 2011, MRS Bulletin 33(8):752-758.

Lv, Y., et al., Fabrication of Superhydrophobic Films on Aluminum Foils with Controllable Morphologies, Jan. 11, 2013, Adv. Mat. Res., 641-642:414-417.

Mozalev, A., et al., The superhydrophobic properties of self-organized microstructured surfaces derived from anodically oxidized Al/Nb and Al/Ta metal layers, 2012, Electrochimica Acta 82:90-97.

Wang, Z., et al., In situ growth of hierarchical boehmite on 2024 aluminum alloy surface as superhydrophobic materials, 2014, RSC Adv. 4:14708-14714.

Zhao, J., et al., CoMn-layered double hydroxide nanowalls supported on carbon fibers for high-performance flexible energy storage devices, 2013, J. Mater. Chem. A, 1:8836-8843.

\* cited by examiner

FIGURES 2(a1) – 2(a5) and 2(b1) – 2(b5)
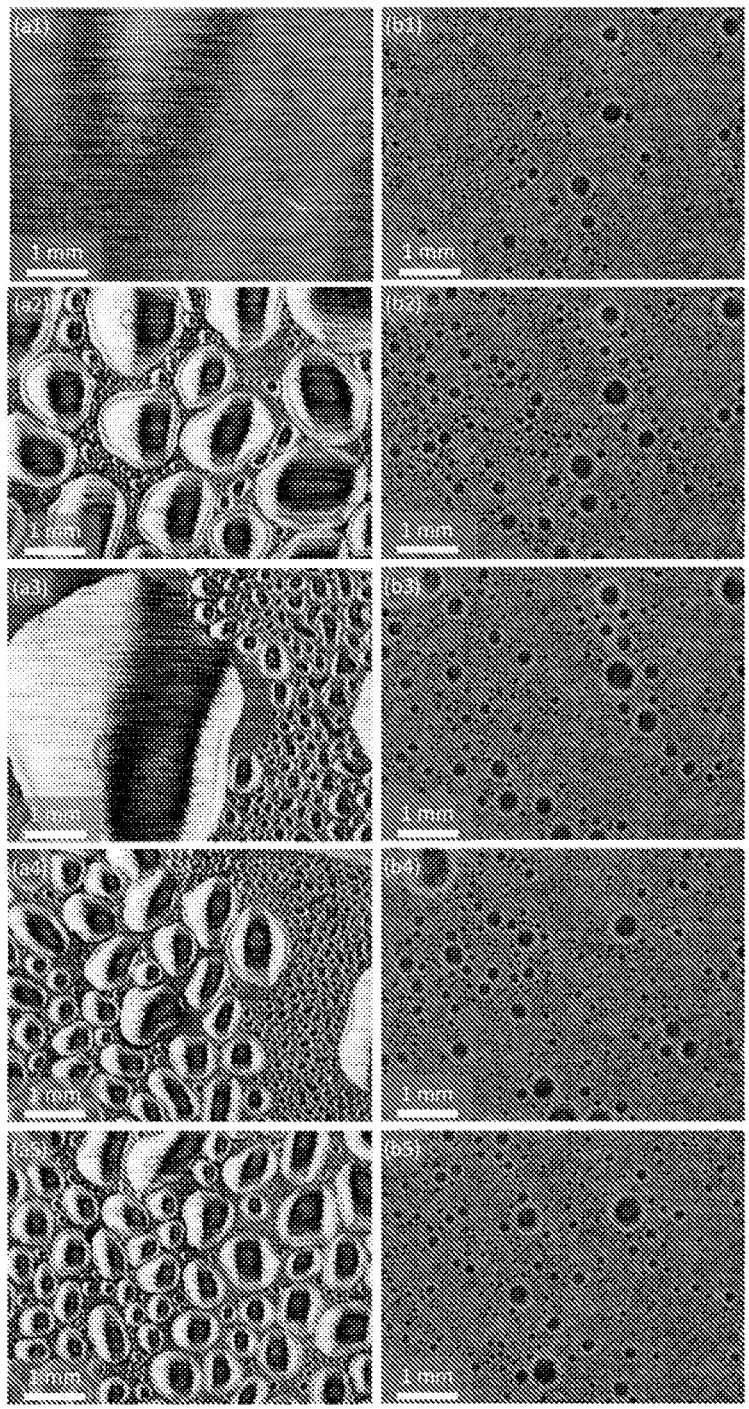

FIGURES 3(a1) – 3(a3), 3(b1) – 3(b3), and 3(c1) – 3(c3)
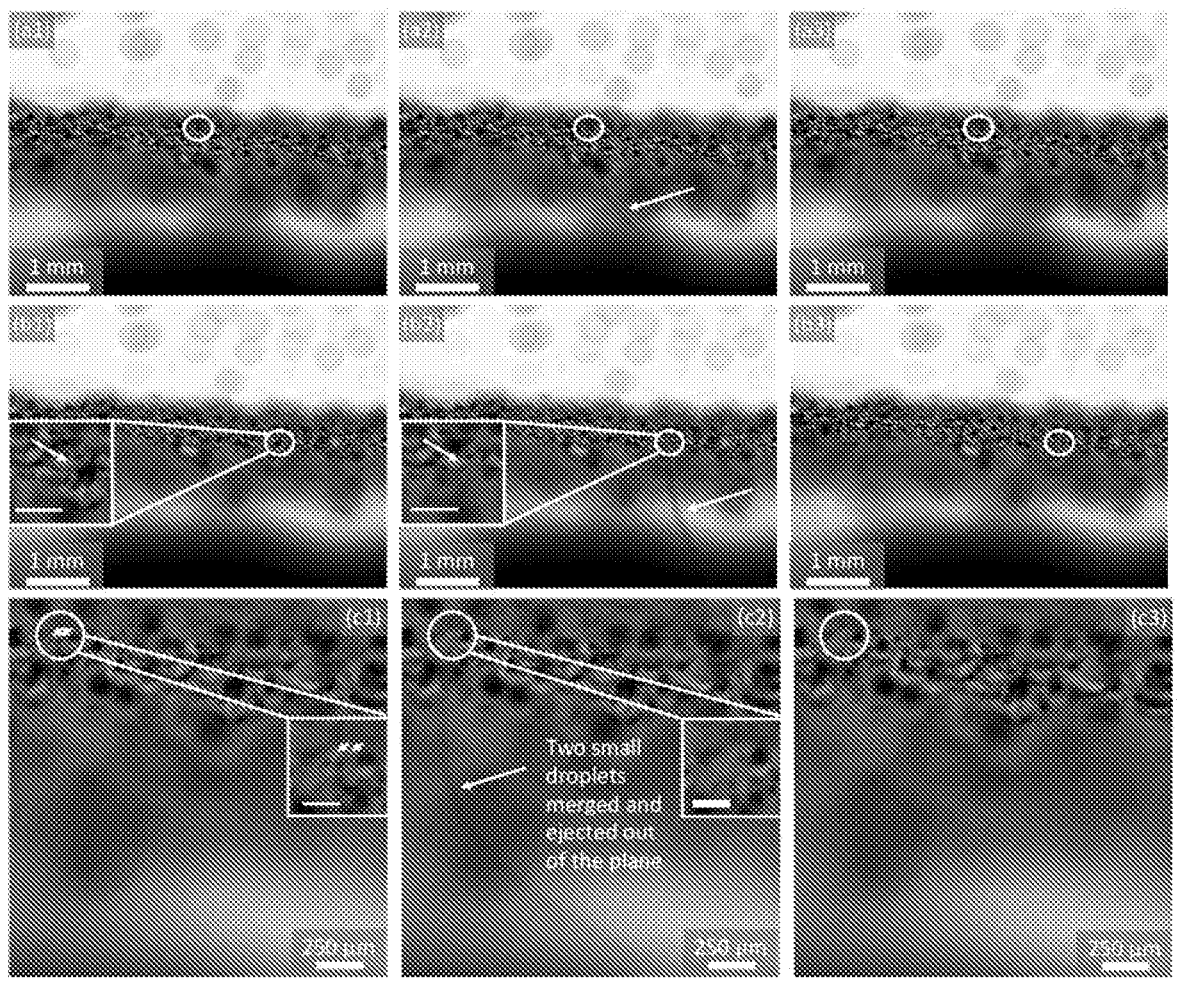

DROPLET EJECTING COATINGS

CROSS-REFERENCE TO RELATED APPLICATIONS

This application is a U.S. national phase application under 35 U.S.C. § 371 of PCT/US2017/052119, filed Sep. 19, 2017, which claims the benefit of U.S. Provisional Application Nos. 62/396,728, filed Sep. 19, 2016, and 62/397,319, filed Sep. 20, 2016, both of which are incorporated by reference herein in their entireties.

FIELD OF THE INVENTION

The invention relates to compositions that eject condensed fluids from a surface and methods of use thereof.

BACKGROUND

Water fouling is a common problem in condensation heat transfer applications. Hydrophobic coatings are currently used to promote dropwise condensation heat transfer, which has previously been shown to enhance heat transfer by as much as three-fold, relative to uncoated surfaces. Dropwise condensation typically involves droplets nucleating on the surface, coalescing, and sliding down the surface due to gravity. "Jumping droplet" condensation is a relatively new phenomenon that has been observed with only two hydrophobic surfaces in systems that contain only water vapor. Contrary to typical dropwise condensation, "jumping droplet" condensation involves droplets nucleating on the surface, growing through the further condensation of vapor and/or coalescence and then jumping from the surface out of plane. This has been shown to enhance the heat transfer as high as 35% over typical dropwise condensation. Non-condensing gases, such as air, have been observed to prevent the jumping droplet condensation; consequently, this phenomenon has never been observed in the presence of non-condensing gasses such as air. Furthermore, supersaturation above 1.12 has also observed to cause the droplets to flood the surface instead of jumping, resulting in reduced heat transfer relative to a typical hydrophobic surface. (Miljkovic, N., et al., Jumping-Droplet-Enhanced Condensation on Scalable Superhydrophobic Nanostrucutred Surfaces, *Nano Lett.* 13:179-187, doi:10.1021/nl303835d (2013); Miljkovic, N., et al., Modeling and Optimization of Superhydrophobic Condensation, *J. Heat Transf-Trans. ASME* 135:14, doi:10.1115/1.4024597 (2013); Milkovic, N., et al. Condensation heat transfer on superhydrophobic surfaces, *MRS Bull.* 38:397-406, doi:10.1557/mrs.2013.103 (2013); Aili, A., et al., in *ASME 2016 5th International Conference on Micro/Nanoscale Heat and Mass Transfer*, V001T004A001 (ASME, 2016))

One problem encountered in high efficiency HVAC applications is blowoff of condensed water vapor being entrained in the primary flow, such that corrosion and other undesirable outcomes occur. To combat corrosion of heat exchanger fins, barrier coatings are often employed. In order to maintain high water condensation efficiency (air side heat transfer efficiency), coatings which modify the surface energy (to be either hydrophobic or hydrophilic or even biphilic (patterned areas of hydrophobic and hydrophilic)) are applied. Hydrophilic coatings retain the condensate on the fins in a thin layer, so as to minimize downstream blowoff. Hydrophobic coatings are designed to rapidly shed condensate from the surface.

Improved surface structures that promote ejection of droplets for heat transfer and/or dehumidification, without the disadvantages of previous systems, are needed for high efficiency applications. Improved surface structures that promote ejection of droplets and increase overall heat transfer can lead to heat exchanger designs with improved overall efficiency, smaller overall footprint, simpler fin designs, or combinations of all of the above.

BRIEF SUMMARY OF THE INVENTION

Coating compositions for ejection of droplets of condensed liquid from a surface and methods of making and using such compositions are provided herein.

The coating compositions include a nanostructured layer deposited on a substrate, and a hydrophobic coating deposited on the nanostructured layer. The texture and/or geometry of the nanostructured layer provides a driving force for droplet ejection.

In one aspect, coating compositions are provided that are deposited on a substrate. The coating ejects droplets of a condensate from the substrate in the presence of a gas mixture that includes one or more non-condensing gas (NCG). In some embodiments, the gas mixture comprises, consists of, or consists essentially of air or the primary molecular consitutents of air. In some embodiments, the condensate comprises, consists of, or consists essentially of water.

In some embodiments, the coating ejects droples of a condensate from the substrate under condensing conditions, wherein the condensate is formed at supersaturation, for example, above about 1.1. In some embodiments, the coating ejects droplets of a condensate from the substrate under condenity conditions, wherein the droplet arithmetic mean diameter of the ejected droplets is less than about 500 micrometers.

In some embodiments, the coating includes a layer of a nanostructured coating material. In some embodiments, the nanostructured coating material is hydrophobic. In other embodiments, the coating includes a hydrophobic functional layer deposited or layered over at least a portion of the nanostructured coating material.

In another aspect, methods of making a coating composition that ejects droplets of a condensate from a substrate under condensing conditions are provided. In some embodiments, the methods include depositing a nanostructured coating material on a substrate, wherein the coating material is textured such that droplets are ejected from the surface of the coating material. For example, the coating may be textured such that droplets are ejected when the cohesive forces (e.g., surface tension force) exceed the surface tension adhesion forces, thereby resulting in a net force vector with a component directed away from the substrate, e.g., out of the plane of the substrate. In some embodiments, the nanostructured coating material is hydrophobic. In other embodiments, the method further includes depositing or layering a hydrophobic functional on the surface of at least a portion of the nanostructured coating material.

In another aspect, a method for removal of a condensate from a surface is provided. In some embodiments, the method includes exposing a substrate that includes a coated substrate (a substrate that includes a coating composition on a surface of the substrate) to a condensing substance, under conditions in which condensation of the substance occurs, wherein fluid droplets (condensed droplets) of the substance are formed on the surface and the surface ejects the droplets. In some embodiments, the coated substrate includes a nanostructured coating material, e.g., a layer of a nanostructured coating material deposited on the substrate. In some embodiments, the nanostructured coating material is hydrophobic. In other embodiments, the coating includes a hydrophobic functional layer deposited or layered over at least a portion of the nanostructured coating material.

In some embodiments, the droplets are ejected in the presence of one or more NCG. In some embodiments, the coating ejects droplets in the presence of a gas mixture that includes one or more NCG. In some embodiments, the gas mixture comprises, consists of, or consists essentially of air or the primary molecular consitutents of air. In some embodiments, the condensed droplets comprise, consist of, or consist essentially of water.

In some embodiments, the droplets that are ejected from the substrate are formed at supersaturation, for example, above about 1.1. In some embodiments, the droplets that are ejected from the substrate have a droplet arithmetic mean diameter less than about 500 micrometers.

In some embodiments, the coated substrate is exposed to a gas mixture, such as air, that includes particulate material, e.g., air that includes particulates, and the method include collection of the particulate material, e.g., airborne particulates, in the ejected droplets, thereby removing the particulate material, e.g., airborne particulates, from the gas mixture, e.g., air.

In another aspect, methods for heat transfer are provided, wherein the coating compositions described herein are exposed to a condensing substance under conditions in which the substance condenses as droplets on the surface of the composition, and wherein the droplets are ejected from the surface. The methods may include exposure of the coating composition to the condensing substance in the presence of one or more non-condensing gases (NCG(s)), such as air, component(s) of air, and/or inert gas(es). The methods may include condensation of the condensing substance under conditions of supersaturation, for example, supersaturation above about 1.0, about 1.1, or about 1.25. In some embodiments, the condensing substance is water, ethanol, or a refrigerant substance, or a mixture thereof.

In another aspect, heat exchangers are provided. Heat exchangers can be designed to utilize the coatings described herein and address the primary problems of fouling, efficiency and corrosion. Aluminum fins are typically used in the volume manufacture of heat exchangers owing to their low cost and high performance. The methods described herein address the application of nanostructured coatings to this construction material. Also described herein are heat exchanger designs that benefit from the implementation of the disclosed coatings and operation in a jumping droplet mode of condensation. Close fin spacing of at least about or greater than about 4 fins per inch, 8 fins per inch, 10 fins per inch, 12 fins per inch, 14 fins per inch, 16 fins per inch, 18 fins per inch, 20 fins per inch, 22 fins per inch, 24 fins per inch, 30 fins per inch, or greater permit effective heat transfer and high condensate collection efficiency. Fin spacing as measured as the distance between the fins may be as low as about 25 microns, 50 microns, 75 microns, 100 microns, 200 microns, 400 microns, 800 microns, 1200 microns, 1600 microns, 2000 microns, or 5000 microns. In this design, a fin coated with a nanostructured coating described herein is placed in close proximity to one or more additional fins. The fins may be coated with either hydrophobic, droplet ejection coatings as described herein, or with hydrophilic materials such as the base coating as described herein. Small droplets that are ejected from the surface and that are too small to impinge upon the adjacent surface are vaporized downstream, and heat transfer to these droplets causes their evaporation, with the latent heat being removed and further reducing the air temperature. Droplets that impinge upon adjacent plates may be collected and removed from the system through a condensate collection system. In certain nonlimiting embodiments, droplets are collected downstream from the droplet ejection surfaces.

In another aspect, heat exchangers are provided. In some embodiments, heat exchangers are provided that include a droplet ejection coating material as described herein. In some embodiments, a heat exchanger further includes one or more hydrophilic surface(s). Droplets may be ejected from the droplet ejection coating and collected by the hydrophilic surface. In some embodiments, adjacent surfaces of the heat exchanger are coating with droplet ejection coating material and the remaining surfaces are hydrophilic. In some embodiments, condensate droplets are formed at supersaturation, for example, above about 1.1. In some embodiments, droplets are ejected at an arithmetic mean droplet diameter less than about 500 micrometers. In some embodiments, the temperature of the surface of the heat exchanger is reduced below the freezing point of the condensate.

BRIEF DESCRIPTION OF THE DRAWINGS

FIGS. 2(a1)-2(a5) and 2(b1)-2(b5) show highly magnified darkfield images showing the progression of condensation on both uncoated aluminum (2(a1)-2(a5)) and aluminum coated with a droplet ejection coating as described in Example 1 (2(b1)-2(b5)). As time progressed on the uncoated aluminum surface (2(b1)→2(b2)→2(b3)→2(b4)→2(b5)), droplets nucleated and coalesced into larger droplets. These droplets gravitationally drained by running down the surface. This process then repeats to remove water from a stream of NCGs. As time progresses on the surface coated with the droplet ejection coating, the droplets nucleate, grow, and eject from the surface before they can become large enough to be drained by gravity. This results an increased exposed area on the heat transfer surface, thus increasing overall heat transfer efficiency FIGS. 3(a1)-3(a3), 3(b1)-3(b3), and 3(c1)-3(c3) show highly magnified darkfield image progressions of sub-millimeter droplets ejecting out of plane of the condensing surface described in Example 1. Sequential frames are from videos of a vertical plate recorded at 52 frames per second. The droplets ejected orthogonal to the gravity vector and then fell downward due to gravity and moved to the right due to the airflow in a controlled wind tunnel designed to simulate the environment inside of an air conditioning system. The camera was oriented 20 degrees to the vertical such that a narrow strip of the substrate was in the focal plane. The degree of supersaturation varied from 1 to 2 with no loss of performance. The inset scale bars in 3(b1) and 3(b2) are 250 μm and the inset scale bars in 3(c1) and 3(c2) are 100 μm. As the time progresses from 1 to 2 to 3, the step between each image is about 0.02 seconds. The droplet ejecting in 3(b) is about 120 µm while the droplets ejecting in 3(c) are about 10 to 20 µm. As time progresses on each shown droplet ejection from 3(a1)→3(a2)→3(a3), 3(b1)→3(b2)→3(b3), and 3(c1)→3(c2)→3(c3). The droplets can be seen on the surface in 3(a1), 3(b1), and 3(c1). 20 milliseconds later, the droplet can be observed leaving the surface in 3(a2), 3(b2), and 3(c2). The ejection event happens in a small fraction of a second as 3(a3), 3(b3), and 3(c3) indicate the droplet has cleared the field of view of the microscope. These ejection events happen many thousands of times per second; these three events are only an example of the phenomenon.

DETAILED DESCRIPTION

Figures 1A, 1B:
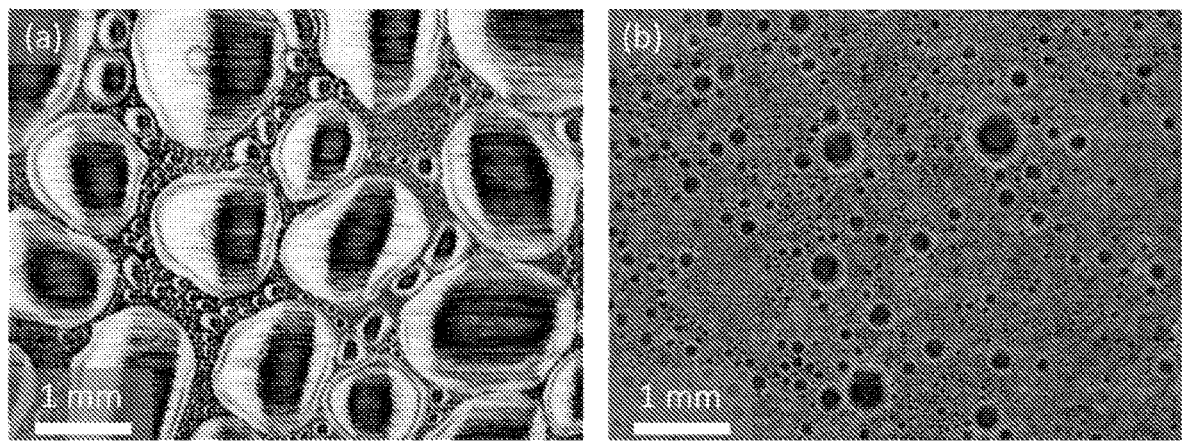
FIGS. 1(a)-1(b) show highly magnified darkfield images of uncoated aluminum (1(a)) and aluminum coated with a droplet ejection coating as described in Example 1 (1(b)), after 12 hours under condensing conditions with water. The image appears to show significantly less water condensed on the coated surface of 1(b), but this is not the case. The water condensed and was rapidly ejected from the surface before the droplets reached a measurable size as observed through a microscope. Using the method described in Example 1, the water droplets were ejected at an average diameter of less than 500 micrometers.
Figure 4A:
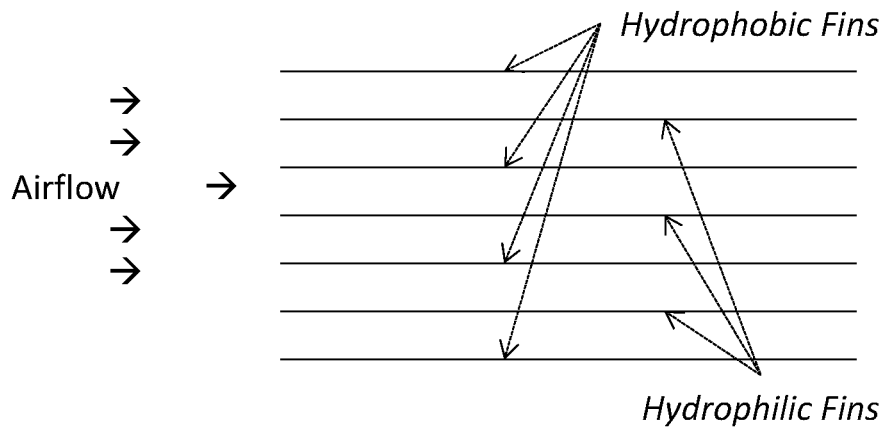
FIGS. 4a-4b show a schematic representation of a heat exchanger utilizing nanostructured coatings as described herein. 4a shows an arrangement of fins with alternating droplet ejection and hydrophilic coatings. 4b shows a schematic arrangement of heat exchanger fins with a droplet ejection coated area upstream and a hydrophilic coated area downstream from the heat exchanger fluid circulation tube in cross section. The figures are not meant to be final design configurations, but rather to schematically convey concepts described herein.
Figure 4B:
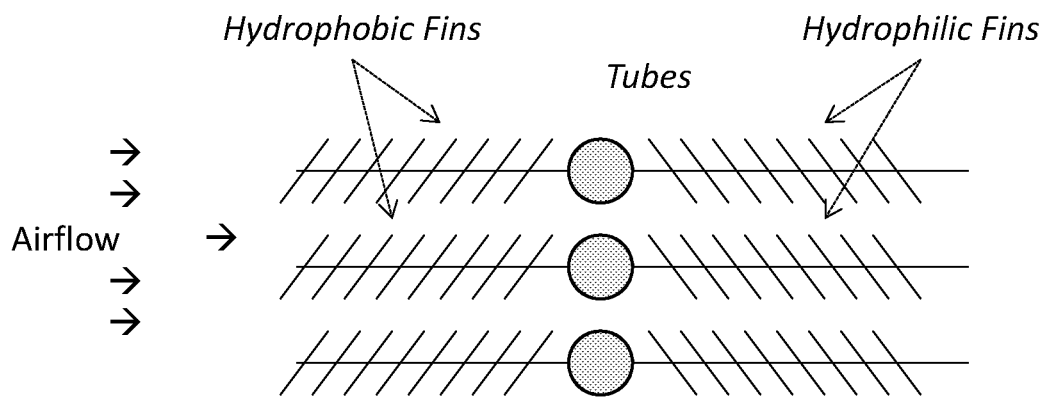
Figure 5A:
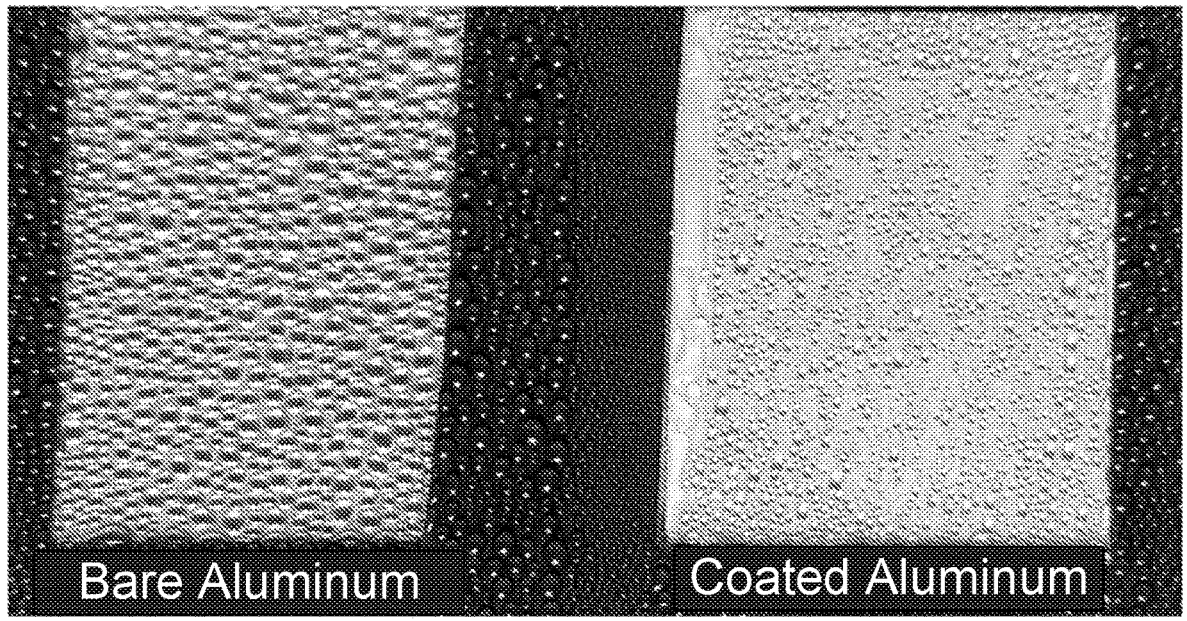
FIGS. 5a-5d show the onset of the freezing process on the uncoated panel (left) and liquid condensate on the treated panel (right).
Figure 5B:
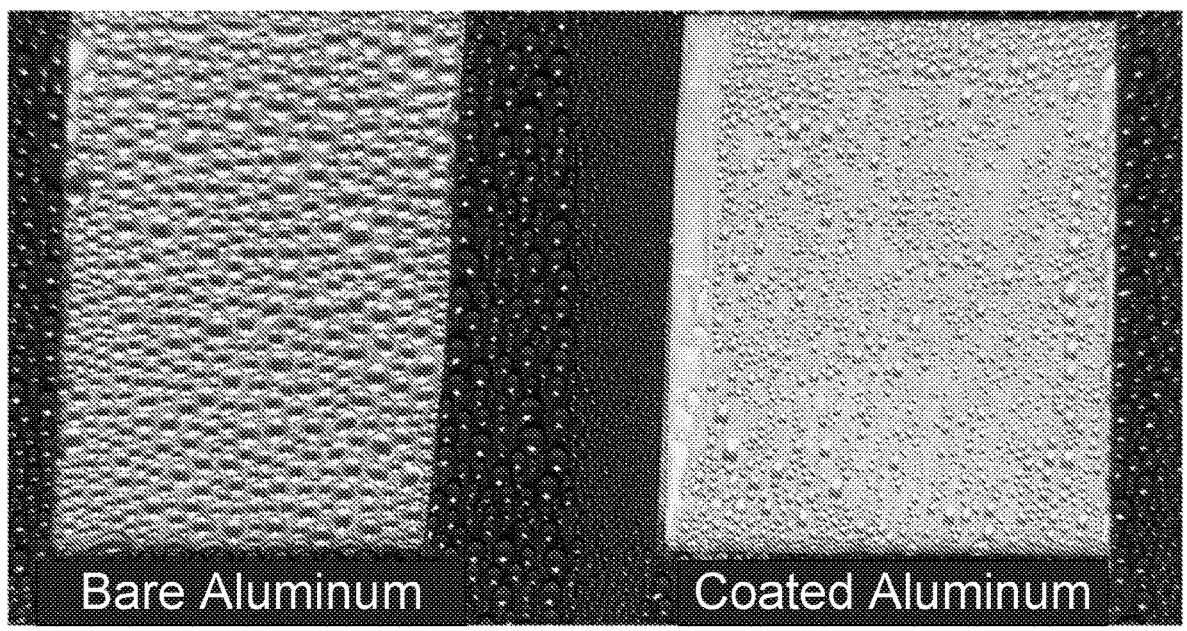
Figure 5C:
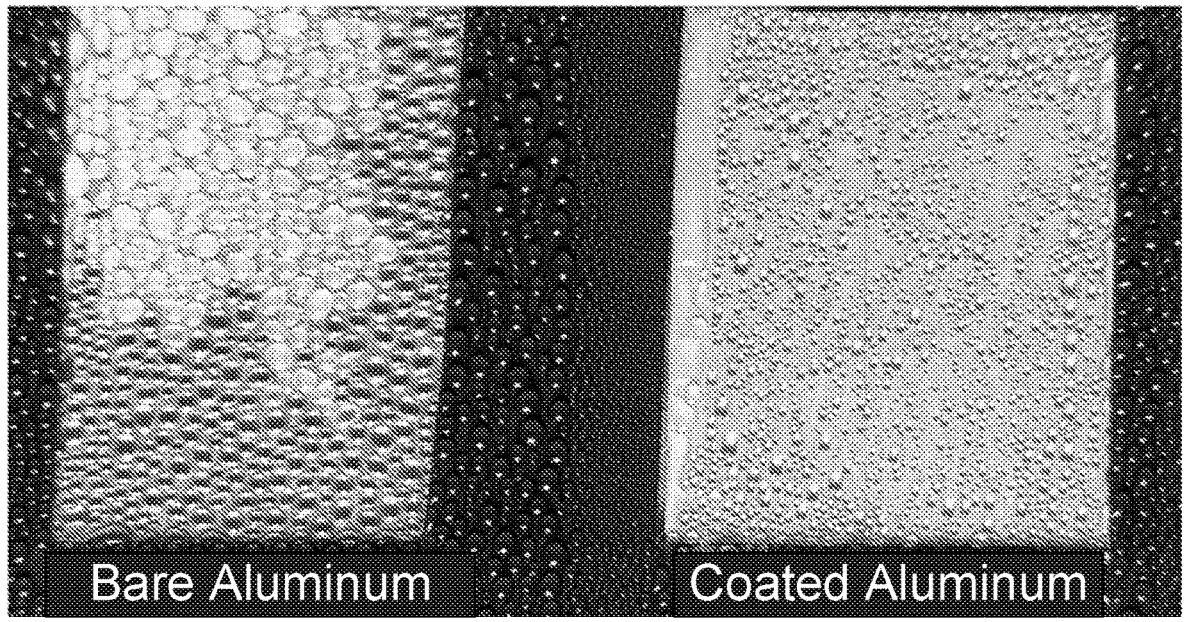
Figure 5D:
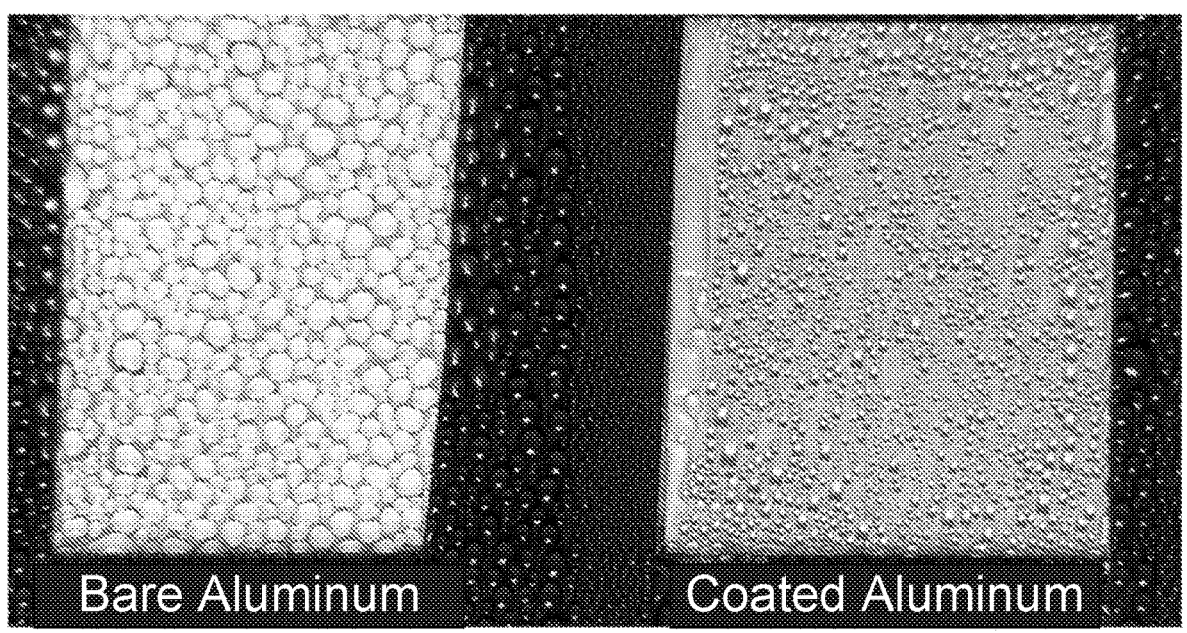

The invention provides coating compositions and methods for efficient heat transfer by ejection of condensed liquid from a surface under condensing conditions. The compositions described herein include a nanostructured coating layer on a substrate, with a hydrophobic functional layer deposited on the nanostructured layer. The geometry of the nanostructured layer provides a driving force for ejection of droplets from the surface. The coating compositions described herein eject droplets of condensed liquid (e.g., water) from the surface in the presence of non-condensing gases (e.g., air or components thereof, or inert gases). In some embodiments, the condensed liquid is ejected from the surface at supersaturation greater than about 1, greater than about 1.1, greater than about 1.2, or greater than about 1.25. In some embodiments, the droplets are ejected from the surface with an arithmetic mean of diameters less than about 2000 microns, less than about 1500 microns, less than about 500 microns, less than about 250 microns, less than about 100 microns, less than about 75 microns, less than about 50 microns, less than about 25 microns, or less than about 10 microns. In some embodiments, the arithmetic mean of diameters is any of about 2000, 1500, 500, 250, 100, 75, 50, 25, or 10 microns to about 5 microns. Droplets may be ejected from the surface to enhance heat transfer, to affect ambient humidity, and/or to enhance dehumidification. In certain embodiments, the coating compositions described herein may be used in applications such as, but not limited to, water collection and purification, condensate collection, solvent and/or contaminant recovery, atomization, or humidification.

Definitions

Numeric ranges provided herein are inclusive of the numbers defining the range.

"A," "an" and "the" include plural references unless the context clearly dictates otherwise.

A "nanostructured" coating refers to a coating composition that has a feature in at least one dimension that is less than 100 nanometers.

"Non-condensing gases" or "NCGs" refers to gasses that do not change phase at the desired condensing conditions of a vapor. Oxygen and nitrogen, for example, are NCGs when air is being dehumidified.

"Air" refers herein to a mixture of NCGs in a gaseous stream that also includes condensable materials such as water vapor, and other condensable components. For example, air may include, but is not limited to, oxygen, nitrogen, argon and/or other inert gas(es), and more easily condensable gases, such as water vapor and carbon dioxide. The primary molecular constituents of air are nitrogen, oxygen, argon, carbon dioxide, neon, helium, methane, and water vapor.

"Condensing conditions" refers to a condition wherein a surface is cooled below the dewpoint of a vapor.

"Supersaturation" refers to a condition when the vapor pressure of a vapor is above the equilibrium vapor pressure at a given temperature and pressure. A supersaturation of 1 refers to a relative humidity of 100% and any further increase promotes condensation.

"Ejection" in reference to droplets of liquid refers to leaving a surface with a velocity that has a non-zero normal component.

"Surface tension" refers to the tension of a liquid surface caused by cohesive forces in the bulk of the liquid that pulls inward toward the bulk and tends to minimize the surface area for a given volume.

"Droplet adhesion forces" refers to the forces responsible for causing a droplet to pull outward and spread on a surface, thus preventing it from forming a sphere. Contrarily, "cohesive forces" are those forces that cause a droplet to pull itself inward and form a sphere, such as surface tension.

"Refrigerant" refers to a substance or mixture used in a refrigeration cycle as the working fluid. This fluid often goes through phase changes, but need not to be effective.

"Working fluid" refers to a liquid or gas that absorbs or transmits energy. For example, the working fluid in an air conditioner system is the coolant such as Freon, glycol, or water that is used to cool the process fluid.

"Process fluid" refers to a liquid or gas that is being treated by interaction with the working fluid. For example, in an air conditioner system, the process fluid is the air that is being cooled.

"Sensible heat ratio" refers to the ratio of the sensible cooling capacity to the total cooling capacity.

Droplet Ejecting Coatings

Droplet ejecting coating materials are provided that eject condensed droplets of liquid from the surface of a substrate. The droplet ejecting coating material includes a nanostructured material deposited on a substrate, and a hydrophobic material deposited on the nanostructured material. The nanostructured material includes a geometry that provides a driving force for droplet ejection from the surface. The geometry may include, but is not limited to, a nanostructure that causes the droplets to take a distorted shape upon condensation.

Droplet ejecting coating materials may include a surface that is textured such that condensed droplets are ejected when the surface tension force exceeds the droplet adhesion forces, thereby resulting in a net force vector that has a component out of the plane of the substrate, for example, in applications in which the removal of the liquid from the surface or the inlet stream is advantageous. A surprising example of such an application is the prevention of freezing, i.e., prevention of onset of frost, for example, wherein the droplet diameter at ejection is sufficiently small, less than about 500 micrometers, which prevents frost and frost adhesion on substrates of interest.

The coating materials disclosed herein may eject condensed fluid from the surface in the presence of a gas mixture, e.g., a gas mixture that includes one or more NCGs. For example, the coating materials may eject fluid in the presence of air, gas components of air, or inert gases. In some embodiments, the gas mixture includes oxygen and/or nitrogen. In some embodiments, the gas mixture includes nitrogen, oxygen, carbon dioxide, hydrogen, helium, and argon, or combinations thereof. In one embodiments, the gas mixture consists of nitrogen, oxygen, carbon dioxide, hydrogen, helium, and argon. In some embodiments, the gas mixture includes oxygen, nitrogen, carbon dioxide, and argon, or combinations thereof. In one embodiment, the gas mixture consists of oxygen, nitrogen, carbon dioxide, and argon. In one embodiment, the gas mixture is air.

The coating materials disclosed herein may eject condensed fluid from the surface at supersaturation greater than about 1.0, 1.1, 1.2, or 1.25, or at supersaturation about 1.0 to about 1.1, about 1.1 to about 1.25, about 1.1 to about 3.0, or about 1.1 to 5.0.

Condensed fluid droplets that may be ejected by the coating materials disclosed herein include, but are not limited to, water, ethanol, and refrigerants. In some embodiments, the condensed fluid is selected from water, ethanol, a hydrofluorocarbon (HFC), and a hydrofluoro-olefin (HFO), or a combination thereof. In some embodiments, the condensed fluid is selected from water, ethanol, difluoromethane (HFC-32), difluoroethane (HFc-152a), pentafluoroethane (HFC-125), 2,3,3,3-tetrafluoropropene (HCO-1234yf), 1,3,3,3-tetrafluoropropene (HFO1234ze), or a combination thereof. In one embodiment, the condensed fluid is water. In some embodiments, the condensed fluid is an industrial process or working fluid.

Droplet ejecting coating materials as described herein may eject condensed fluid droplets from the surface having an arithmetic mean of diameters of less than about 2 millimeters, less than about 1 millimeter, less than about 500 microns, less than about 250 microns, less than about 100 microns, less than about 75 microns, less than about 50 microns, less than about 25 microns, or less than about 10 microns, or any of about 10 microns to about 25 microns, about 25 microns to about 50 microns, about 50 microns to about 75 microns, about 75 microns to about 100 microns, about 100 microns to about 250 microns, about 250 microns to about 500 microns, about 500 microns to about 1 millimeter, about 1 millimeter to about 2 millimeters, about 10 microns to about 50 microns, about 25 microns to about 100 microns, or about 100 microns to about 500 microns.

In some embodiments, the nanostructured coating layer includes nanostructured metal, ceramic, glass, or polymer.

In some embodiments, the nanostructured coating layer includes a ceramic that is a metal oxide. The metal oxide may be, for example, a transition metal oxide, tin(IV) oxide, magnesium (II) oxide (MgO), or aluminum oxide. In some embodiments, the transition metal oxide is selected from zinc oxide, iron(II, III) oxide($Fe_3O_4$), iron(III) oxide ($Fe_2O_3$), manganese(IV) oxide ($MnO_2$), manganese(II, III) oxide ($Mn_3O_4$), manganese(III) oxide ($Mn_2O_3$), nickel(II) oxide (NiO), nickel(III) oxide ($Ni_2O_3$), zirconium(IV) oxide ($ZrO_2$), titanium(IV) oxide ($TiO_2$), chromium(III) oxide ($Cr_2O_3$), copper(II) oxide (CuO), cobalt(II) oxide (CoO), cobalt(III) oxide ($Co_2O_3$), and cobalt(II, III) oxide ($Co_3O_4$).

In some embodiments, the nanostructured coating layer includes a glass. In some examples, the glass includes silica or a silicate.

In some embodiments, the nanostructured coating layer includes a polymer. In some examples, the polymer is a fluoropolymer, polyethylene, or polypropylene. In some embodiments, the polymer is a fluoropolymer selected from polytetrafluoroethylene (PTFE), polyvinylidene (PVDF), polyvinylfluoride (PVF), and fluorinated ethylene propylene (FEP), or a combination thereof. In some embodiments, the polymer is a block copolymer, for example, but not limited to, wherein each block of the copolymer is less than about 500 monomer units, or less than about 200 monomer units. For example, the block copolymer may by a hydrophobic polymer that includes two or more monomer units. In some embodiments, the block co-polymer may include one or more monomers, such as, but not limited to, propylene, ethylene, tetrafluoroethylene, trifluoroethylene, vinylfluoride, hexafluoropropoylene, 1,1-difluoroethylene, 1,2-difluoroethylene, and isobutylene.

In some embodiments, the hydrophobic coating layer may include one or more hydrophobic functionality selected from alkyl, vinyl, phenyl, and fluoroalkyl. For example, the hydrophobic functionality may include, but is not limited to, alkylsilane, vinylsilane, phenylsilane, or fluoroalkylsilane. In certain nonlimiting embodiments, the hydrophobic functionality is hexamethyldisilazine, sodium methylsiliconate, potassium methylsiliconate, dimethiconol, perfluorooctyltriethoxysilane, perfluorodecyltriethoxysilane, perfluorooctyltrimethoxysilane, perfluorodecyltrimethoxysilane, octadecyltriethoxysilane, methyltrimethoxysilane, methyltriethoxysilane, isobutyltrimethoxysilane, isobutyltriethoxysilane, or phenyltriethoxysilane. In some embodiments the hydrophobic coating refers to a functionalized perfluoropolyether such as perfluoropolyether silane, perfluoropolyether phosphonic acid, or perfluoropolyether phosphonate. In some embodiments, the hydrophobic coating refers to a coating that when added to a smooth substrate, imparts a contact angle greater than or equal to 90 degrees.

Methods of Making Droplet Ejection Coatings

Methods of making coatings that eject droplets of condensed liquid from a substrate, e.g., under condensing conditions, are provided. In some embodiments, the methods include: (a) depositing a nanostructured coating layer on a substrate; and (b) depositing a hydrophobic functional layer, i.e., a hydrophobic material that includes one or more hydrophobic functional groups, on the surface of the nanostructured material. In other embodiments, the methods include: depositing a layer of nanostructured coating material on a substrate, wherein the nanostructured coating material is hydrophic or includes one or more hydrophobic functional groupos on its surface.

The nanostructured layer may be deposited on the substrate by any suitable means, including but not limited to, sol gel processing, chemical bath deposition, dip coating, spray coating, physical vapor deposition, or chemical vapor deposition. In one embodiment, the nanostructured coating is a metal oxide that is deposited by, for example, sol gel processing, chemical bath deposition, or dip coating. The hydrophobic functional layer may be deposited onto the nanostructured layer by any suitable means, including but not limited to, vapor deposition or dip coating.

Nonlimiting examples of nanostructured and hydrophobic coating materials are described above. The substrate may include a metal, metal alloy, glass, polymer or ceramic material.

In some embodiments, the substrate is pretreated prior to deposition of a nanostructure coating layer as described herein, to remove debris or substance(s) on the surface and/or to smooth the surface (i.e., to access the substrate to promote adhesion and to prevent defects), with one or more treatment(s) selected from cleaning, degreasing, rinsing, etching, desmutting, oxidizing, removing previous treatments, roughening, planarizing, steam cleaning, thermal oxidation, and smoothing.

Methods of Using Droplet Ejecting Coatings

Methods of using coatings as described herein for removal of fluid from surface, for heat removal, for removal of airborne particulate and contaminants, for dehumidification, and/or for the prevention of frosting are also provided. The methods include exposing a substrate with a droplet ejecting coating thereon, as described herein, to a condensing substance, under conditions in which condensation of the substance occurs, wherein fluid droplets of the substance are formed on the surface, and wherein the surface ejects the droplets. In some embodiments, the methods include (a) depositing a nanostructured coating layer on a substrate; and (b) depositing a hydrophobic functional layer on the surface of the nanostructured material, and (c) exposing the coated substrate to a condensing substance, under conditions in which condensation of the substance occurs, wherein fluid droplets of the substance are formed on the surface, and wherein the surface ejects the droplets.

In some embodiments, exposing the coated substrate to the condensing substance occurs in the presence of one or more gases, e.g., comprising or consisting of one or more NCGs. In one example, the coated substrate is exposed to the condensing substance in the presence of air. In some embodiments, the coated substrate is exposed to the condensing substance in the presence of a gas mixture that includes one or more of nitrogen, oxygen, carbon dioxide, hydrogen, helium, and argon, or a combination thereof. In some embodiments, the quantity of the gas mixture to which the coated substrate is exposed may be, for example, about 1 ppb to about 10 ppm, greater than about 5 ppm, greater than about 1%, or greater than about 20%, or in certain embodiments up to 100%, for example, to separate water vapor from an air stream, or to separate condensable substance(s) from a gas stream.

In some embodiments, exposing the coated substrate to the condensing substance occurs at supersaturation of the substance. In one example, the supersaturation is greater than about 1.1. In some embodiments, the supersaturation is greater than any of about 1.0, 1.1, 1.2, or 1.25, or is about 1.0 to about 1.1, about 1.1 to about 1.25, about 1.1 to about 3.0, or about 1.1 to about 5.0

In some embodiments, the substrate may be used in a working environment with no external electric field or bias.

The condensing substance may be any substance that condenses on a surface and that is desired to be removed from the surface, for example, for purposes of reducing the temperature at which onset of condensation occurs or to increase the amount of condensation that occurs at a given temperature. For example, the condensing substance may be water, ethanol, or a refrigerant. In one embodiment, the condensing substance is water vapor. In some embodiments, the droplets that are ejected may change the properties of an industrial process or working fluid.

The condensing substance may be any substance that condenses or adheres on a surface and that is desired to be removed from the surface, for example, for the purposes preventing the formation of adhered frost or ice on the surface. For example, the condensing substance may be water, wherein the surface temperature is below the freezing point of water, and the water is removed from the surface prior to the formation of the solid phase (frost or ice). In another embodiment, the condensing substance may be water, wherein the surface temperature is below the freezing point of water, and the liquid droplet ejects partially from a wetted to a dewetted state, which depresses the apparent freezing point of the liquid.

In some embodiments, the coatings described herein enhance the efficiency of a distillation system, e.g., a vapor distillation device, by increasing the condensation temperature, thereby reducing the energy requirements for the distillation system.

In some embodiments, the coatings described herein reduce the energy requirements for condensation in process equipment, such as, for example, a condenser, e.g., a distillation reflux condenser.

In some embodiments, the coatings described herein increase the condensation performance in process equipment, such as, for example, a vent gas stream, e.g., a knock-out pot.

In some embodiments, an external force, e.g., air flow, vibration, and/or droplet coalescence, provides excess energy in addition to the surface tension, to effect droplet ejection.

In some embodiments, ejected condensate droplets may be directed and collected. For example, an external collection unit or part, e.g., an adjacent external collection unit or part, may be used to collect condensed, ejected liquid. Examples of such a collection unit or part include, but are not limited to, a heat exchanger (e.g., heat exchanger fin), a screen, a filter, a mist collector, and a condensate collection pan.

In some embodiments, droplets are ejected into a cooled gas mixture stream, e.g., a gas mixture stream that includes one or more NCG, e.g., air, and revaporized, thus decreasing the temperature of a working or industrial process fluid. For example, droplets ejected into the cooled gas mixture stream may vary the sensible heat ratio of the cooled working or industrial process fluid. In one embodiment, the condensing substance is water and the working or process fluid is air, and the relative humidity is increased and the temperature is decreased, thus increasing the sensible heat capacity of the heat exchanger.

In some embodiments, ejected droplets will interact with airborne particulate and collect this material to the droplet. Several droplets can be collected in a variety of ways and the collected particulate can be removed from the system.

In some embodiments, ejected droplets will interact with airborne compounds. Airborne compounds which are soluble in the ejected droplet material will be solubilized and collected by the ejected droplets. Airborne compounds which are capable of suspension in the ejected droplet material will be suspended and collected by the ejected droplets. Several droplets can be collected in a variety of ways and the collected compounds can be removed from the system. For example, ejected water droplets may collect additional droplets of airborne substances or facilitate heterogeneous condensation.

Heat Exchanger Designed for Use with Droplet Ejecting Coating

A system. that includes alternating fins of hydrophilic and hydrophobic (e.g., droplet ejection) coatings and methods of making same are provided. Hydrophilic coating areas can be generated in conjunction with the hydrophobic (e.g., droplet ejection) coatings described herein by submerging and processing alternate fins separately and reassembling, or generating adjacent areas of droplet ejection and hydrophilic properties by partially submerging the part to be coated after the initial deposition of the nanostructured coating. A previously assembled unit may be partially coated with hydrophobic (e.g., droplet ejection) coating upstream and remain hydrophilic downstream, via partial submersion during the coating process. An assembled unit may be coated with a hydrophilic material, and subsequently partially coated with a hydrophobic coating.

A structure in which alternating fins are coated with hydrophobic (e.g., droplet ejection) and hydrophilic material is described. Condensate formed on hydrophilic coated fins wicks water, for return to a condensate drip pan. Condensate formed on hydrophobic (e.g., droplet ejection) material coated fins ejects condensate, to be collected on adjacent fins or collection apparatus for return to a condensate drip pan.

A heat exchanger or other system in which some areas (e.g., upstream areas) are coated with hydrophobic (e.g., droplet ejection) materials and other areas (e.g., downstream areas) are hydrophilic is described. In some embodiments, condensate formed on droplet ejection coated areas and ejected may be collected by downstream hydrophilic materials. In some embodiments, any part of the heat exchanger from which droplets are to be ejected may be coated with droplet ejection material as described herein, and remaining parts that will collect the condensate may be a hydrophilic material. For example, the chassis, drip pan, etc. may be coated with the droplet ejection) material, in addition to, or alternatively to, fins. In some embodiments, adjacent surfaces of the heat exchanger are coated with droplet ejection (e.g., hydrophobic) coating and the remaining surfaces are hydrophilic. In some embodiments the hydrophilic material is a coating, and in other embodiments the surface is inherently hydrophilic or is rendered hydrophilic by a surface treatment.

A system that includes fins that include droplet ejection coatings and methods of making the same are provided. A structure in which fins are coated with droplet ejection material is described. Condensate formed on droplet ejection material coated fins ejects condensate, to be collected for removal. Condensate formed on droplet ejection coated areas and ejected may be collected by downstream hydrophilic materials. In some embodiments, any part of the system (e.g, heat exchanger) from which droplets are to be ejected may be coated with droplet ejection material as described herein, and remaining parts that will collect the condensate may be a hydrophilic material. For example, the chassis, drip pan, etc. may be coated with the droplet ejection material, in addition to, or alternatively to, fins. In some embodiments, the hydrophilic material is a coating, and in other embodiments the surface is inherently hydrophilic or is rendered hydrophilic by a surface treatment. In other embodiments, ejected condensate coalesces naturally (e.g. droplet—droplet) or actively (e.g. mesh screen coalescer) and is removed by gravity or other accelerations of the gas mixture stream (e.g., cyclone or bend in stream).

Heat Exchanger Designed for Use with Droplet Ejecting Coating for Antifrost

A heat exchanger or other system that reduces or eliminates frost formation, and methods of making the same, are provided. Such a system that includes a droplet ejection coating material as described herein, and frost formation is reduced or eliminated in comparison with an identical system that does not include the droplet ejection coating material. Condensate formed on surfaces that contain the droplet ejection coating is removed via the droplet ejection mechanism described herein. A structure in environmental surface temperatures and conditions in which condensate retained on the surface would eventually form a solid frost or ice ejects droplets of the condensate via the droplet ejection mechanism as described herein, thereby delaying or preventing altogether the formation of solid frost or ice. The formation of frost and ice is detrimental to the efficiency of such devices and additional equipment, and methods and materials described herein are used to remove or prevent formation of the frost and/or ice. Structures that include droplet ejection coatings also reduce the time and/or energy required to remove frost and/or ice. Systems may be designed using the droplet ejection coating materials described herein to minimize energy use for defrosting and/or deicing. For example, the defrosting cycle may be optimized for energy minimization. For example, the defrosting system and hardware may be modified for energy minimization (e.g., lower power) and/or removed altogether.

The following examples are intended to illustrate, but not limit, the invention.

EXAMPLES

Example 1

Droplet ejecting coatings were created by submerging a cleaned substrate in an aqueous equimolar solution of an alkaline earth metal or transition metal salt and hexamine with concentrations ranging from 10 mM to 1 M for a time ranging from 5 minutes to 3 hours. For example, an aluminum substrate was used with zinc nitrate as the transition metal salt at a concentration of 50 mM, and a temperature of 90° C. for duration of 2 hours. The substrate was then removed from the solution, rinsed, and air dried. The coated substrate was then baked at a temperature ranging from 100° C. to 600° C. for a duration ranging from 5 minutes to 48 hours. For example, the coating was baked at a temperature of 550° C. for a duration of 24 hours. The surface was then submerged in a dilute acid rinse solution between the pH of 1 and 7 for a duration ranging from 15 seconds to 24 hours. For example, the substrate was submerged in an acid solution at a pH of 3 for 24 hours. The substrate was then placed in a solution containing the hydrophobic functional molecule at a concentration ranging from 0.05% to 2% for a duration ranging from 2 seconds to 48 hours. For example, a 1% solution of perfluorodecyltriethoxysilane was created in azeotropic ethanol. A few drops of acetic acid were added to catalyze the reaction. The substrate was then submerged in the solution for 24 hours, rinsed, and then annealed at 120° C. for an hour. The substrate was then cooled in a stream of supersaturated air to eject droplets from the surface.

Results are shown in FIGS. 1(*a*)-1(*b*), FIGS. 2(*a*1)-2(*a*5) and 2(*b*1)-2(*b*5), and FIGS. 3(*a*1)-3(*a*3), 3(*b*1)-3(*b*3), and 3(*c*1)-3(*c*3).

Example 2

A droplet ejecting coating is created by dipping a cleaned substrate in a solution of a block copolymer consisting of two or more monomers with at least one of the monomers capable of being formed into a hydrophobic polymer. For example, a 1% solution of poly(tetrafluoroethylene-block-ethylene) is created using a solvent or solvent mixture. The polymer block length can range from 50 to 500 monomer units, such as a length of 500 monomer units. For example, the solvent is a Vertrel/trichlorobenzene mixture in a 50/50 ratio. The substrate is then removed and allowed to dry. The substrate is then cooled in a stream of supersaturated air to eject water droplets from the surface.

Example 3

A droplet ejecting coating is created by dipping a cleaned substrate with a roughened texture in a solution of a block copolymer consisting of two or more monomers with at least one of the monomers capable of being formed into a hydrophobic polymer. For example, the substrate is dipped into a melt of block copolymer of fluorinated ethylene propylene (FEP) wherein the polymer block lengths can range from 50 to 500 monomer units, such as a length of 500 monomer units. No solvent is required as the coating is formed from the melt. The substrate is then cooled in a stream of the super saturated air to eject water droplets from the surface.

Example 4

A 200 aluminum mesh of 5056 aluminum alloy was coated conformally using the process as described in Example 1, leaving the open area largely unchanged. The mesh had the following characteristics:

| Mesh Size | 200 × 200 |
|---|---|
| Opening Size | 0.0029" (75 microns) |
| Open Area | 34% |
| Wire Diameter | 0.0021" (53 microns) |

Example 5

A 1 inch (in.)×2 in. 3003 aluminum alloy panel was coated conformally using the process as described in Example 1. A similar 1 in.×2 in. 3003 aluminum alloy panel was untreated. The panels were mounted to an electrically cooled module in a side by side fashion. The temperature of the cooled module was reduced to the point where condensation was observed and droplet ejection condensation was noted on the treated panel. Condensation was noted on the untreated panel. The cooled module temperature was further reduced to approximately 5° F. of subcooling, and freezing of the droplets was observed on the untreated panel, whereas freezing did not occur on the treated panel.

FIGS. 5a-5d show the onset of the freezing process on the uncoated panel and liquid condensate on the treated panel.

Although the foregoing invention has been described in some detail by way of illustration and examples for purposes of clarity of understanding, it will be apparent to those skilled in the art that certain changes and modifications may be practiced without departing from the spirit and scope of the invention. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. A composition comprising a coating deposited on a metal substrate,
wherein the coating comprises a hydrophobic functional layer coated over a nanostructured coating material,
wherein the nanostructured coating material comprises a metal oxide that is deposited onto the substrate without the introduction of an electric current,
and wherein the metal oxide and the substrate comprise different metals.

2. A composition according to claim 1, wherein the nanostructured coating material is hydrophobic.

3. A heat exchanger comprising regions that comprise the composition according to claim 1.

4. A heat exchanger according to claim 3, further comprising regions that comprise one or more hydrophilic surface(s).

5. A heat exchanger according to claim 4, wherein the regions that comprise the composition are partially coated surfaces of fins, wherein the partially coated surfaces are adjacent surfaces in the heat exchanger, and wherein the heat exchanger comprises remaining surfaces that are hydrophilic.

6. A heat exchanger according to claim 3, wherein when the heat exchanger is in operation, droplets are ejected from the coating at an arithmetic mean droplet diameter less than about 500 micrometers.

7. A heat exchanger according to claim 3, wherein when the heat exchanger is in operation, frost formation on the heat exchanger is reduced or eliminated in comparison with an identical system that does not comprise the composition.

8. A composition according to claim 1, wherein the metal oxide of the nanostructured coating material comprises a transition metal oxide, tin (IV) oxide, magnesium (II) oxide, aluminum oxide, or an earth metal oxide.

9. A composition according to claim 1, wherein the hydrophobic functional layer comprises alkylsilane, vinylsilane, phenylsilane, or fluoroalklylsilane.

10. A composition according to claim 1, wherein the nanostructured coating material is immobilized on the substrate by heat treatment at a temperature from 100° C. to 600° C.

11. A composition according to claim 1, wherein the nanostructured coating material is deposited onto the substrate by submerging the metal substrate in a solution comprising: an alkaline earth metal or a transition metal salt; and hexamine.

12. A composition according to claim 1, wherein the substrate comprises aluminum and the nanostructured coating material comprises zinc.

13. A heat exchanger according to claim 3, wherein the metal oxide of the nanostructured coating material comprises a transition metal oxide, tin (IV) oxide, magnesium (II) oxide, aluminum oxide, or an earth metal oxide.

14. A heat exchanger according to claim 3, wherein hydrophobic functional layer comprises alkylsilane, vinylsilane, phenylsilane, or fluoroalklylsilane.

15. A heat exchanger according to claim 3, wherein the substrate comprises fins that comprise aluminum.

16. A heat exchanger according to claim 15, wherein the nanostructured coating material comprises zinc.

17. A heat exchanger according to claim 3, comprising fins that comprise the composition, configured to alternate with fins that are coated with a hydrophilic material.

18. A composition according to claim 1, wherein the nanostructured coating material is deposited onto the substrate by submerging the metal substrate in a solution comprising: an alkaline earth metal or a transition metal salt; and an amine.

19. A composition according to claim 1, wherein the nanostructured coating material comprises zinc oxide, magnesium (II) oxide (MgO), iron (II, III) oxide ($Fe_3O_4$), iron (III) oxide ($Fe_2O_3$), manganese (IV) oxide ($MnO2$), manganese (II, III) oxide (Mn3O4), manganese (III) oxide (Mn2O3), nickel (II) oxide (NiO), nickel (III) oxide (Ni2O3), chromium (III) oxide (Cr2O3), copper (II) oxide (Cu0), cobalt (II) oxide (CoO), cobalt (III) oxide (Co2O3), or cobalt (II, III) oxide (Co3O4).

20. A composition according to claim 1, wherein the hydrophobic functional layer comprises one or more hydrophobic functionality selected from alkyl, vinyl, phenyl, and fluoroalkyl.

21. A heat exchanger according to claim 3, wherein the hydrophobic functional layer comprises one or more hydrophobic functionality selected from alkyl, vinyl, phenyl, and fluoroalkyl.

* * * * *